United States Patent

[11] 3,585,597

[72] Inventor Harold W. Holmerud
Solana Beach, Calif.

[21] Appl. No. 829,898
[22] Filed June 3, 1969
[45] Patented June 15, 1971
[73] Assignee Stromberg Datagraphix, Inc.
San Diego, Calif.

[54] INFORMATION STORAGE AND RETRIEVAL SYSTEM
5 Claims, 3 Drawing Figs.

[52] U.S. Cl. .......... 340/172.5
[51] Int. Cl. .......... G06f 3/14
[50] Field of Search .......... 352/12; 353/25; 340/149, 152, 153, 172.5, 174.1 M; 235/157; 328/123; 317/77

[56] References Cited
UNITED STATES PATENTS

| | | | |
|---|---|---|---|
| 3,191,006 | 6/1965 | Avakian | 340/172.5 X |
| 3,292,489 | 12/1966 | Johnson et al. | 340/172.5 X |
| 3,325,786 | 6/1967 | Shashoua et al. | 340/172.5 |
| 3,325,787 | 6/1967 | Angell et al. | 340/172.5 |
| 3,332,071 | 7/1967 | Goldman et al. | 340/172.5 |
| 3,439,986 | 4/1969 | Moore | 340/149 X |

*Primary Examiner*—Paul J. Henon
*Assistant Examiner*—Harvey E. Springborn
*Attorneys*—John R. Duncan and Anderson, Luedeka, Fitch, Even and Tabin

ABSTRACT: A system is described for storing and retrieving information stored on two types of media, such as microfilm and magnetizable material, the latter being more readily altered to revise and add current information. Means are provided for displaying the two records simultaneously, and selection of one record is sufficient to cause selection of a corresponding record stored on the other type of media through the utilization of addressing means which automatically access the corresponding record on one media upon selection of a record on the other media.

INVENTOR.
HAROLD W. HOLMERUD
BY
Anderson, Luedeka, Fitch, Even & Tabin
ATTORNEYS INVENTOR.
HAROLD W. HOLMERUD
BY
Anderson, Luedeka, Fitch, Even & Tabin
ATTORNEYS

INFORMATION STORAGE AND RETRIEVAL SYSTEM

This invention relates to information storage and retrieval and, more particularly to a system for storing and retrieving information stored on two types of media, one of which is not readily alterable and one of which is readily alterable.

For storing large quantities of data in a small volume and at a low cost per page, many information storage and retrieval systems utilize microfilm. Microfilm, as used herein, is not intended to means only film utilizing silver halide emulsions converted to metallic silver during development. The term is also intended to include diazo dye films, diazo scattering films, dry process silver films, photochromic films, thermoplastic films, and electrostatically processed films, among others. Information is recorded on microfilms as alphanumeric characters of much reduced size in frames of data, where a frame corresponds to a printed page in conventional book. The frames representing the pages of a book may be recorded in sequence on a roll of microfilm comprising a strip 16 mm. wide or 35 mm. wide, or on a sheet of microfilm comprising a strip (e.g. 3 inches ×5 inches) called a microfiche. A typical roll of 16 mm. film may contain 100 feet of film and about 1000 to 2000 frames. The 100 foot rolls are often encased individually in boxes or magazines. A microfiche may contain about 48 to 200 frames arranged in rows and columns. The frames on roll microfilm or on microfiche may be made by photographing pages of printed data or by photographing the screen of a cathode-ray tube driven by a computer. In the typical system, each frame is individually numbered either explicitly or implicitly. For example, in a well-known system, every frame on a roll of microfilm is explicitly numbered by coded opaque rectangles beside each frame. In systems wherein the frames are implicitly number, the frame number is implied by the position of the frame within a roll (e.g. page 273 of a book may be recorded on the 273rd frame of a 1000 frame roll of microfilm).

A major disadvantage of storage and retrieval systems employing only microfilm is that information cannot be easily added or changed in the store. In order to add data to a roll system, additional magazines must be provided or the roll upon which a page is to be added has to be refilmed or spliced. Although microfiche systems are somewhat easier to add to, since a single fiche is a smaller increment than a single magazine of roll film, it is still difficult and expensive to change data already recorded. Moreover, in order to add a single line to page already recorded, the page must usually be refilmed, which may require refilming the entire roll or the entire microfiche. This drawback is significant in many types of systems in which records are kept current or require relatively frequent change.

One type of storage system which affords a means of much more easily altering stored information by additions or changes is an electronic information storage system. Such a system typically stores information on reusable magnetic media, such as magnetic tapes, magnetic drums, or magnetic discs. The latter type of storage media affords an advantage in that the discs may be arranged in a stack in a manner which provides rapid and random access to information on any of the discs, as is known in the art. Data may be stored in the form of binary codes (for example 6 to 9 bits per character) which are stored in the magnetic state of small portions of the magnetizable surface. The stored bits are stored in sequence on each track of each tape or disc and are thus stored in locations having implied address numbers. Each track may be provided with an index point from which a sequence of points may begin, and the tracks may be numbered in sequence (e.g. left to right on a tape or innermost to outermost on a disc). Each disc or tape may be assigned a number and the apparatus may be designed to provide access to any of the tapes or discs in accordance with their assigned numbers. Thus, the bits representing a given character, a given word, a given line, or a given page of data may be obtained from the store by specifying, via electrical signals, the address (e.g. disc, track and bit location) of the desired information.

The information stored in the magnetic information storage system may be read out by employing a cathode-ray tube display. For retrieving information stored in the system, the operator may first key a known address of an index, which is then automatically retrieved from its fixed address in the magnetic file. Electronic circuitry converts the binary signals from the magnetic storage system into alphanumeric characters, and these are displayed on the cathode-ray tube screen. The display may be generated by deflecting the beam of the cathode-ray tube rapidly in a pattern for writing the desired character or by passing the beam through a selected beam shaping aperture to form the cross section of the beam into the desired shape of a character. Both techniques are well known in the art. After locating the desired item in the displayed index, the operator may key its address on a suitable keyboard and the retrieval system then retrieves the requested information from the magnetic storage system and displays it on the cathode-ray tube screen in the same manner.

Although magnetic information storage systems allow ready alteration of stored data, since the storage media are selectively erasable and reusable, and although selection of a particular group of data may be accomplished quickly and automatically in a random access store with a minimum of manual operations, random access magnetic information storage systems have the drawback in that large amounts of data cannot be stored economically. A page of alphanumeric characters of perhaps 5,000 characters requires at least 30,000 binary bits of magnetic storage at a cost of at least $10.00 at current prices. The same page of data can be stored on microfilm for a cost of about 1 cent. Obviously therefore, if the data is voluminous and especially if it need not be updated often, microfilm is far less costly. Thus, magnetic storage is generally not economical for records which are archival in nature. Random magnetic storage, however, is useful in maintaining records and similar types of information which require both frequent alteration and rapid access, such as the current month records of checking accounts in a commercial bank. The records for previous months, however, being archival or permanent in nature, are more economically stored on microfilm. Records which require periodic updating, but need not be accessed or retrieved rapidly are often stored on reusable magnetic tape.

Some of the most highly developed practical systems in current use combine features of microfilm storage and electronic storage, thus enabling the storage of large amounts of archival information cheaply, while enabling alteration of current information. For example, a utility company may employ microfilm in 100 ft. magazines to store the financial and service accounts of its customers. Motorized microfilm viewers, a computer, a magnetic disc file, and retrieval stations equipped with cathode-ray tube displays and keyboards may be provided for use by telephone inquiry clerks. The microfilm units may cover the billings and payments of the past year, each customer account being identified by an account number. Recent billings or payments, such as within the last month, may be stored in a magnetic disc file, and such information placed on film only when it ceases to be current, such as at the end of the the month. Upon receiving an inquiry from a customer, the clerk may select the the magazine containing the account in accordance with the account number and insert the magazine into the microfilm viewer. For example, the account number 17,405 may be found at frame 405 of magazine 17. The clerk energizes the motor-driven microfilm viewer, allowing it to run until the frame required appears on the screen, whereupon he stops the motor. The clerk then keys the account number on the keyboard of the retrieval station so that the magnetic disc file will produce information for display on the screen of the cathode-ray tube. The clerk may then answer the customer's inquiry. If the clerk wishes to add information to the records after talking to the customer, he may key the new information on the keyboard and it is thereafter transmitted via the computer to the disc file for storage. When doing this, the clerk must also key the account number so that the computer can store the new data in the proper address on the disc file.

A significant disadvantage of known combined microfilm-magnetic storage systems is that the address of the account must typically be put into the equipment by some manual operation two or three times in order to complete one transaction. Thus, the address must be given initially to cause the proper information to be displayed on the microfilm viewer, once again to cause the proper information to be displayed on the cathode-ray tube screen, and a third time if changes are to be in the information stored in the magnetic information storage system. Another significant disadvantage in known combined systems is that the information is displayed at two separate locations, one for microfilm and one for magnetically stored information. Moreover, the equipment for operating each of the two systems is generally separate and must be operated separately.

It is an object of this invention to provide an improved system for storing and retrieving information.

Another object of the invention is to provide an improved system for storing and retrieving information stored on two types of media, one of which is not readily alterable and one of which is readily alterable.

A further object of the invention is to provide a system for storing and retrieving information in which information stored on two types of media is retrieved after a single manual operation identifying the information, thereby saving labor and time, and reducing the possibility of human errors.

It is another object of the invention to provide integrated equipment containing both microfilm and electronic display means, and containing electronic data entry means, all at one work station.

A further object of the invention is to provide an integrated information retrieval station capable of displaying records from two stores and data entered by an operator in a merged or superimposed format to facilitate the comparison of the records and the verification of the data.

Another object of the invention is to provide a system for storing and retrieving information in which microfilm retrieval equipment and electronic retrieval equipment and data entry equipment are interconnected in a manner such that identification of a selected record only once serves to retrieve the desired information from both microfilm and magnetic stores to associate any corrections or new data entered with the selected record.

A still further object of the invention is to provide an integrated information storage and retrieval system including a magnetic store, a microfilm store, electronic and microfilm display equipments, data entry equipment and an index which may be stored in the microfilm or magnetic stores, and means permitting selection of the index and a particular item in the index by manual or semiautomatic means and for causing the records associated with the item selected in the index to be automatically retrieved from the magnetic and the microfilm stores and displayed on a common view screen.

Other objects of the invention will become apparent to those skilled in the art from the following description, taken in connection with the accompanying drawings wherein.

Very generally, the system of the invention comprises a first information store 11 for containing a plurality of discrete first records on one type of media. A second information store 12 is provided for containing a plurality of discrete second records on another type of media. One of the types of media is not readily alterable, and one of the types of media is not readily alterable. the second records corresponds to an associated one of the first records. Means 13 are provided for visually displaying selected associated first and second records. Means 14 are provided for facilitating selection of one of the first records. Means 16 and 17 are provided operable in response to selection of one of the first records for display to automatically select the associated one of the second records for display.

Figures 1, 2:
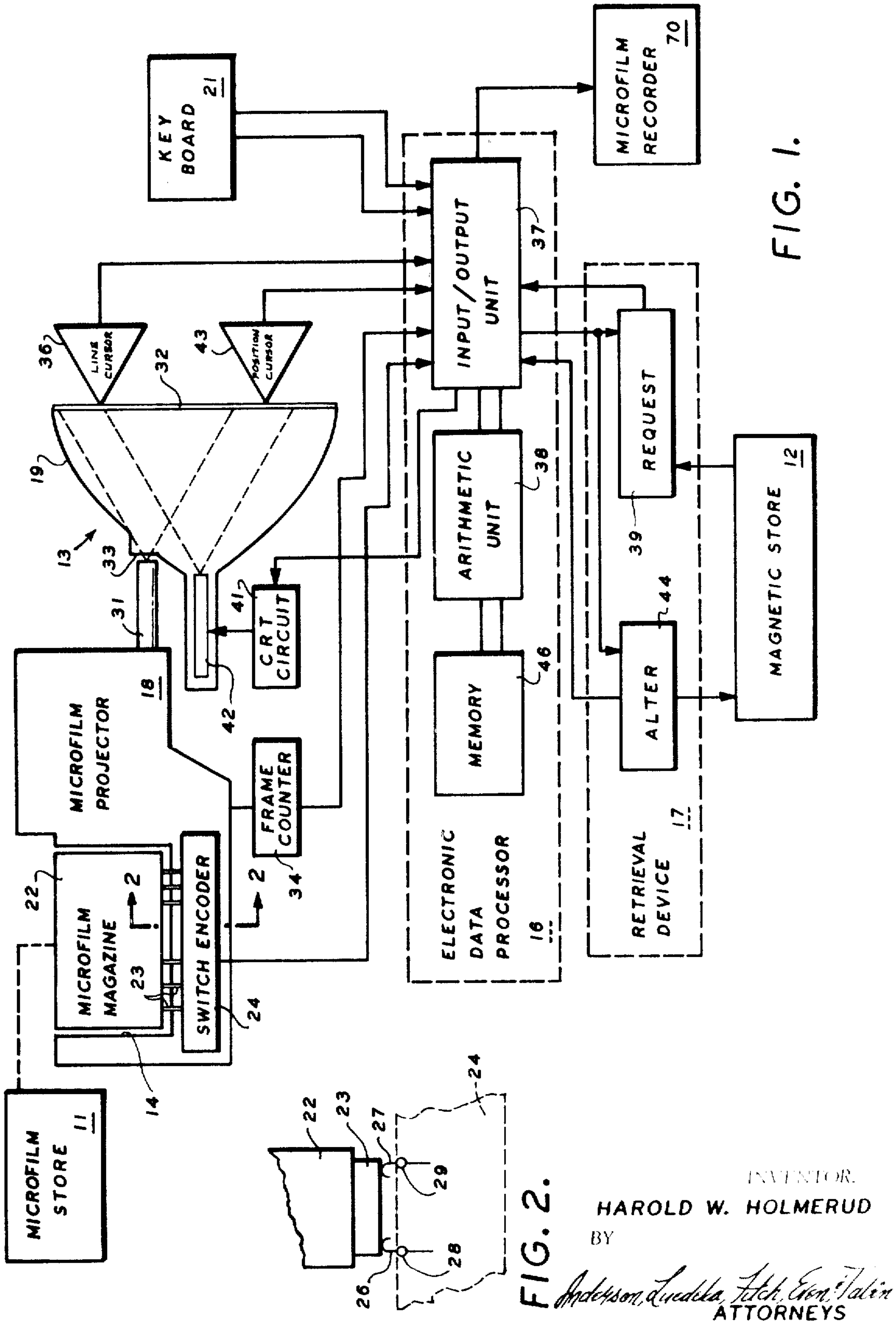
FIG. 1 is a schematic block diagram of a storing and retrieving system constructed in accordance with the invention.
FIG. 2 is a schematic sectional view taken along the line 2–2 of FIG. 1.

Referring now more particularly to the embodiment illustrated in FIG. 1, the first information store is a microfilm store 11, and the second information store is a magnetic store 12. The means which automatically select the second records are an electronic data processor 16 and a retrieval device 17. The system of the invention also includes a microfilm projector 18, a cathode-ray tube 19, and a data entry keyboard 21. The keyboard 21 is located adjacent to the cathode-ray tube 19 so that the operator may utilize the keyboard while observing the display produced by the cathode-ray tube as described below.

The microfilm store 11 comprises a plurality of rolls of microfilm, each roll being encased in a microfilm magazine or container of suitable known design. The microfilm may be any desired size, a convenient size being 16 mm. width in 100 ft. rolls. Each magazine 22 has a row of code bars or raised projections 23 along one side. Certain projections are mission on each magazine so that each magazine is uniquely coded with a binary number.

The operator begins a search by manually selecting a magazine containing the desired record. The magazines may be labeled or number to facilitate selection directly, or an index may be consulted to determine which magazine to select. The index, if desired, may be a printed card or an index roll of microfilm. Selection of the magazine 22 is completed by placing the magazine in a receptacle in the microfilm projector 18, such receptacle thereby constituting the means 14 for facilitating selection of a record from the microfilm store 11.

When inserted in the receptacle 14, the code bars 23 on the magazine 22 close switches in a switch encoder 24. Each bar closes one switch in the switch encoder and, where bars are missing from a given position, the switch in that position is not closed. Referring to FIG. 2, a satisfactory arrangement may be seen wherein, when the microfilm magazine 22 is in position, the bar 23 extends between a pair of resilient contacts 26 and 27 which extend between a pair of electrical terminals 28 and 29 respectively in the encoder 24. Thus, if each magazine has space for 10 code bars, there are 1,024 different unique codes possible. Ten code switches are then required in the switch encoder and the switch encoder generates a 10 bit binary code when a magazine is inserted in the receptacle 14. As will be explained, this code signal is applied to the electronic data processor 16.

After inserting the microfilm magazine 22 in the receptacle 14 of the microfilm projector 18, the operator energizes the projector drive motor, not shown. The film passes through a projection station or aperture of suitable known design and thence onto a takeup reel in the projector. As each frame passes the projection aperture, a magnified image of it is projected through a lens 31 onto a view screen. In the illustrated embodiment, the view screen is the phosphor screen 32 of the cathode-ray tube 19, the image being projected thereon through a flat clear window 33 on the back of the cathode-ray tube envelope. By observing a succession of images projected onto the screen, the operator may stop the projector drive motor when the desired image is observed.

In order to count the images or frames passing the projection aperture in the microfilm projector 18, a frame counter 34 is supplied. The frame counter is operated by a suitable pulsing device, not shown, located within the microfilm projector. For example, such a device may include a photocell and a lamp, positioned on opposite sides of an edge of the microfilm offset from the frames. An opaque mark in the case of transparent microfilm, or a transparent mark in the case of opaque film, is provided on the microfilm edge beside each frame of data. When this line interrupts or passes light between the lamp and the photocell, depending on whether the mark is opaque or transparent, an electrical pulse is generated for operating the frame counter 34. The frame counter 34 may comprise a suitable flip-flop counter of a type known in the art and operates to count the pulses until the film motion is stopped by the operator. The number counted by the frame counter 34 indicates the position of that frame or image on the strip of microfilm in the magazine 22. The frame counter is connected to the electronic data processor 16 for purposes described below.

In order to select a desired line of the data on the image, a line cursor or line finder 36 may be provided. The line cursor 36 consists of a suitable mechanical device which may be moved up and down over the face plate of the cathode-ray tube to be positioned adjacent any of the lines on the displayed image. The line cursor 36 may include 2 plurality of switches which are selectively activated in a predetermined pattern in accordance with the movement of the line cursor to thereby produce a binary code output indicative of the particular line at which the cursor is positioned. For example, 7 binary coded switches may be utilized to provide 128 distinct codes in the event that 128 lines exist in the displayed image. The binary code output of the line cursor is applied to the electronic data processor 16 for reasons subsequently described.

At this point, the operator has manually selected a desired line on the projected microfilm image, and a code corresponding to the exact location of this line is applied to the electronic data processor, such code being developed by the switch encoder 24, the frame counter 34 and the line cursor 36. The electronic data processor 16 includes an input/output unit 37, an arithmetic unit 38, and a memory unit 46. The aforementioned code information is fed to the input/output unit 37, and the data processor temporarily stores the code information in the memory 46 in accordance with known techniques. To retrieve information corresponding to the code input, the operator presses an appropriate button on the keyboard 21, such as one labeled "REQUEST FOR CURRENT DATA." This causes the data processor 16 to convert the stored coded information into address information required to activate the retrieval device 17. The magnetic store 12 may comprise a stack of randomly accessible magnetic discs (not shown). The retrieval device 17 may include a request apparatus 39 therein consisting of a magnetic pickup head (not shown) which is movable in accordance with the address signals supplied thereto from the electronic data processor 16 to position the pickup head adjacent the appropriate location on one of the tracks on one of the discs in the magnetic store 12. The information recorded in the selected track is returned to the input/output unit 37 in the electronic data processor 16. The input/output unit 37 provides an appropriate set of signals to a cathode-ray tube circuit 41 which is connected to a character generating electron gun 42 in the neck of the cathode-ray tube 19. The character generating gun may be of the writing type in which deflection and intensity devices within the gun are driven in a predetermined manner to deflect the beam in a raster or a pattern which writes the characters in a series of dots or strokes on the screen 32 of the cathode-ray tube. On the other hand, the character generating gun 42 may be of the shaped beam type, having appropriate character selection devices for producing predetermined beam cross sections in accordance with selection of shaped apertures in a plate. Both character generating guns of the writing type and of the shaped beam type are well known in the art. Shaped beam tubes are more fully described in U.S. Pat. No. 2,824,250, assigned to the assignee of the present invention. In either case, the cathode-ray tube's electron beam, which is either shaped or deflected in the form of a character, impinges on the phosphor screen 32 and produces luminous alphanumeric characters in a display of retrieved information.

In many instances, it is desirable to be able to alter the information contained in the magnetic store 12 either by adding further information, deleting existing information, or both. To this end, the alter apparatus 44 is provided in the retrieval device 17. The alter apparatus 44 may comprise a magnetic recording head movable in response to the address information produced by the data processor 16 to position the recording head adjacent the selected track on the disc. Information entered on the keys of the keyboard 21 may then be coupled via the input/output unit 37 to the alter apparatus 44, which records it in the track corresponding to the line selected by the line finder 36.

In addition to the line finder 36, or as an alternate to it, an electronic position cursor 43 may be provided at the face of the cathode-ray tube 19. The position cursor 43 may be of any suitable design to provide location information of a particular character on the displayed image. For example, the position cursor may be a light pen or a sonic pen which produces coordinate location information which is converted into binary form for use by the electronic data processor. Suitable circuitry may be also provided for operating a device with the cathode-ray tube 19 itself, such as an electron beam underscore movable by the operator through suitable control of space, backspace, line space and line backspace keys on the keyboard 21.

The location information output of the position cursor 43 is applied to the input/output unit 37 in the electronic data processor 16. This information, together with the information from the switch encoder 24 and the frame counter 34, defines the precise location of the particular character at which the position cursor is located. This information is converted by the data processor 16 into the address of that particular character within the magnetic store 12 and the address information is stored in the memory 46. Upon command from the keyboard 21 applied to the input/output unit 37, the address information of the position cursor 43 is applied to the retrieval device 17. The alter apparatus 44 within retrieval device 17 moves the recording head to the proper disc and track location and records new data at a bit position corresponding to the position of the position cursor 43. Thus the appropriate change is made in accordance with the information supplied to the data processor 16 from the keyboard 21 by the operator. The keyboard may be designed to move the position cursor one space automatically each time a character is typed, properly indicating the position where the next character will be placed, as in the manner of a typewriter. The new data may be stored in the magnetic store exactly as typed, or may be processed further by the data processor. For example, if the information in the store 12 relates to credit accounts, the added information may be the date and amount of an additional credit purchase. The data processor may then be programmed to cause the arithmetic unit 38 to add the purchase amount to the prior balance, and to store on the disc file the purchase amount and date, and the new balance.

In the illustrated embodiment of FIG. 1, the phosphor screen 32 serves as the display surface for the projected images from the microfilm and the phosphorescent images produced by the electron beam of the character generator. Accordingly, the two images may be integrated onto the screen in a manner most convenient for viewing by the operator, and the view screen of the cathode-ray tube may be positioned at the proper location and angle for optimum viewing by the operator. The images may be reproduced separately or may be merged to produce composites. For example, the projected image may correspond to a printed form such as a sales slip, invoice, or bank deposit slip, upon which the electronically generated characters are superimposed so as to fill in the blanks. This mode of operation insures uniformity in the insertion of data by the operator and permits the operator to verify that all the required information has been supplied when all the blanks are filled. By providing a system of the type described above, greater convenience and compactness over previously known systems is achieved. Moreover, the system of the invention is less subject to operator errors because of the integration of two images onto a single screen, and because all phases of a transaction involving a single account, including retrieval of information from archival and current files, correction of data, and addition of data, can be properly performed with only a single manual entry of the identify the account. The elimination of repetitious identity entries reduces labor, expedites services provided to customers, and reduces the probability of human error.

A digitally driven microfilm recorder 70 may be provided as a part of the system. When the records in the magnetic store 12 have been extensively altered and enlarged by data entered through keyboard 21, the contents of store 12 can be processed by data processor 16 and output to recorder 70. Recorder 70 converts the digital data into characters on the screen of a recording cathode-ray tube (not shown), and generates new microfilm by photographing the screen of the recording tube. The new microfilm may be used to update the microfilm store 11. Computer driven microfilm recorders are well known in the art.

Figure 3:
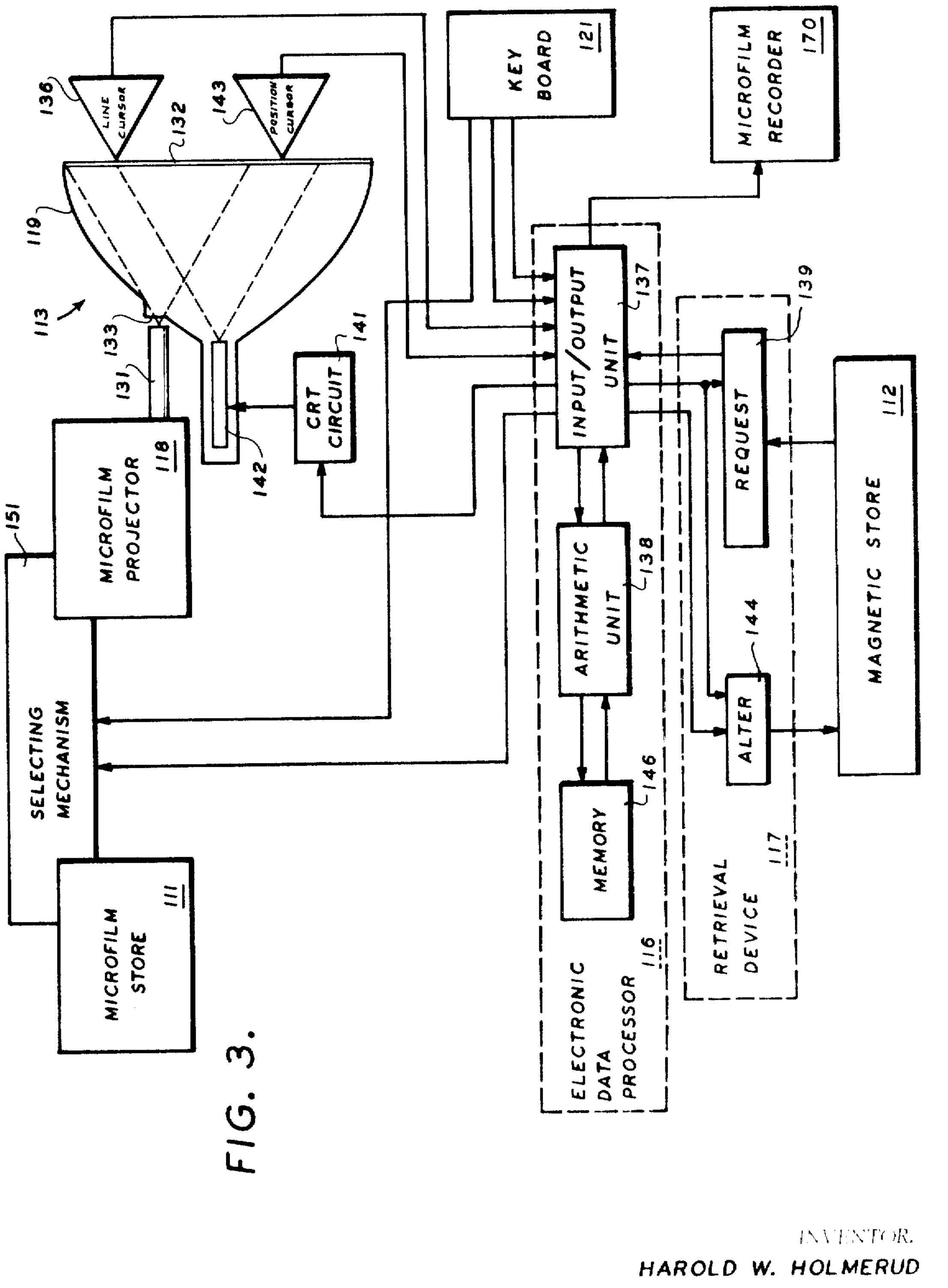
FIG. 3 is a schematic block diagram of a further embodiment of the invention.

Referring now more particularly to FIG. 3, an alternative embodiment of the invention will be described. In FIGS. 3, elements having functions similar to elements in the embodiment of FIG. 1 have been given corresponding reference numbers preceded by the numeral 1. Thus, the alternate embodiment includes a microfilm store 111, a magnetic store 112, means 113 for visually displaying selected associated records from the microfilm store and the magnetic store, an electronic data processor 116, and a retrieval device 117. Data from the microfilm store is displayed by the microfilm projector 118 which projects an image by means of the lens 131 through a transparent window 133 in the back of a cathode-ray tube 119. The image impinges upon the inner phosphor layer of the screen 132 of the cathode-ray tube 119. As was the case in the previous embodiment, a line cursor 136 and a position cursor 143 are provided adjacent the fact of the cathode-ray tube. A keyboard 121 is also provided in a location convenient for viewing of the cathode-ray tube screen by the operator.

In the embodiment of FIG. 3, selection of microfilm from the microfilm store 111 is completely automated so that a given record with the microfilm store may be selected automatically. The micro images are recorded on microfiche, with about 100 images on each fiche. The fiche are code notched at the edge or placed in holders with coded edges so that any desired one can be selected by an automatic slide selecting mechanism 151. Such mechanism are well known in the art and are manufactured by Philco Ford, and the Houston Fearless Corporation. Essentially, such a mechanism consists of a tray filled with microfilm rectangles mounted in magnetic sheet-metal frames. The frames are edge notched in a binary code. A 10 bit code provides unique coding for 1,024 frames. All frames are suspended in a magnetic field. Ten long bars extending longitudinally over the slide tray (or transversely over the frames) can each be moved downward by a solenoid. Hence, energizing selected ones of the solenoids controlling the various bars pushes all slides down except the one whose notches entirely match the energized bars. Thus, one slide is selected from 1,024 and it is then transported mechanically by the selecting mechanism to a suitable projecting station within the microfilm projector 118.

In the alternate embodiment of FIG. 3 an index is stored in the magnetic store 112. To select a given record, identified initially by some means other than the account number (e.g. by customer's name or address), the operator keys in a request for index information by pressing an appropriate key on the keyboard 121. Since the index may be too voluminous to present in a single frame, the request may be broken down into two steps, the first being a request for a coarse index consisting of the page numbers of the main alphabetical index and the beginning and end names of each page. After selecting the desired page number of the main alphabetical index containing the customer's name, the appropriate key may be pressed on the keyboard 121 and such page displayed. Both the request for the coarse index and the request for the particular index page (fine location) are processed by the electronic data processor 116 and converted into address information in accordance with known techniques. For example, the address in store 112, at which the index is stored, may be retained in the memory 146 as part of the computer program. The address is then output through input/output unit 37 when the index key on keyboard 121 is pressed. The address of the index operates the request portion 139 of the retrieval device 117, which may be of a construction similar to the request portion of the retrieval device in the previous embodiment.

Once a particular index page is displayed on the screen 132, the operator may position the line cursor 136 under the line containing the proper name or other identification and presses a retrieve key on the keyboard 121. The electronic data processor 116 now has sufficient information available to completely identify the record requested. This is as a result of information fed to the electronic data processor from the keyboard requesting the coarse index and the particular page of the index, and also the information supplied thereto from the line cursor concerning the particular line of the index page upon which the desired information is listed. This information has bee supplied to and stored in the memory 146 within the electronic data processor. The recorded information is then requested by the operator and the request portion 139 of the retrieval device 117 retrieves this information from the magnetic store 112 and supplies it to the electronic data processor 116. The data processor 116 then supplies corresponding information to the cathode ray tube circuit 141 for appropriate control of the electron gun 142.

Assuming current information is now displayed from the magnetic store 112 on the screen 132 of the cathode-ray tube 119, the operator may press a further appropriate button on the keyboard 121 transmitting a command to the selecting mechanism 151. The selecting mechanism is provided with address information from the memory 146 in the electronic data processor 116 corresponding to the address of the displayed record from the magnetic store 112. The selecting mechanism accordingly operates to automatically select the proper microfiche and frame and provides the proper image to the microfilm projector 118. Accordingly, the operator then sees both the cathode-ray tube information retrieved from the magnetic store 112 and the microfilm information associated therewith on the screen 132. Data may be changed or entered via the keyboard 121 in a manner similar to that described in connected with the embodiment of FIG. 1. To this end, the operator may use a typewriter like action on the keyboard which operates the position cursor 143. Information on the location of the material or record in the magnetic store 112 is supplied to the alter apparatus 144 from the memory 146 in the same manner as such information is supplied to the request apparatus 139. The alter apparatus 144 of the retrieval device 117 then operates to alter the information in the desired manner. As was noted in discussing the embodiment of FIG. 1, it is not necessary that both a line finder 136 and a position cursor 143 be provided.

As was the case in the previous embodiment, the operator is required to identify the desired account only once to obtain both archival and current data and to make changes or additions thereto. Under some circumstances, sufficient information may be supplied to the operator by the customer as to enable the operator to proceed to key the address directly on the keyboard. In this case, the index need not be utilized as the information is already available.

While certain specific embodiments have been described herein, the scope of the invention is not intended to be limited to such specific embodiments. Indices may be used or not as required by the character of the stored data. The position cursor 43—143 may be dispensed with in many applications. Moreover, the line cursor 36—136 may be dispensed with and the position cursor 43—143 may be used to perform all the functions of the line cursor. Other manually controlled devices may be used as the cursors, rather than those devices suggested previously. For example, light pens, volt pens and sonic pens may be utilized to provide location information. Mechanical cursors may be mounted in the film gate of projector 18—118, rather than adjacent the screen 31—132, with similar effect. Data may be entered by means other than keyboards, such as by means of a light pen. The keyboards may be alphanumeric, as in a typewriter, or numeric as in an adding machine, and may be used with or without special function keys such as those previously suggested (retrieve, microfilm, etc.).

It is to be understood that the codes suggested herein in connection with magazines and elsewhere need not be binary, but any other digital code, such as binary coded decimal, excess three and biquinary, may be used. Furthermore, the codes on microfilm magazines need not be raised bars as suggested in connection with FIGS. 1 and 2, but may be reflective or nonreflective spots, magnetic ink spots, or other equivalent means. The code switches described herein as within the microfilm projector can be located instead in the rack which supports a set of magazines. In such a case, when one magazine is removed from the rack for use, a switch in the receptacle in the rack is closed, thus generating the magazine's identifying code.

Although the counters described herein have been described as flip-flop type counters, other types of electronic counters may be used. Ring counters, glow transfer counters, magnetic beam counters, and other electronic Ring may be used equivalently.

Various combinations of the features described herein may be used to achieve similar results. For example a system involving an index on a magnetic disc, manual selection of the indexed microfilm magazine and automatic selection of the frame within the magazine is possible. A system involving an index on microfilm, keying of the identifying code number, and automatic retrieval of both microfilm and magnetic stored data is also possible.

It may therefore be seen that the invention provides an improved system for storing and retrieving information. Information storage and retrieval equipment utilized in the system provides a low cost storage media for archival-type records combined with a higher cost but more readily alterable storage system for current data. A high degree of convenience and reliability is available with a low probability of operator error. The invention provides integrated microfilm and electronic displays convenient to the keyboard or other electronic data entry means. Identification of a selected record only one serves to retrieve the proper information from both archival and magnetic stores, and associates any corrections of new data entered thereon automatically.

Various modifications of the invention in addition to those shown and described herein will become apparent to those skilled in the art from the foregoing description and accompanying drawings. Such modifications are intended to fall within the scope of the appended claims.

I claim:

1. Information storage and retrieval equipment comprising:

a first information store containing a plurality of discrete first records, said first records being on an optically readable first media not readily adapted to selective erasure and reuse:

a second information store containing a plurality of discrete second records, said second records being on an electronically readable second media readily adapted to selective erasure and reuse;

first record selection means for selection of a desired one of said first records;

optical projection means for visually displaying a representation of said selected first record on a viewing surface;

coding means associated with said first selection means to generate a unique code signal corresponding to said selected first record;

record selection means associated with said second information store to automatically select one of said second records in response to said code signal; and cathode-ray tube means to visually display a representation corresponding to said second record on said viewing surface in juxtaposition to said visual display of said representation of said first record.

2. Information storage and retrieval equipment according to claim 1 wherein:

said first information store comprises microfilm on which said plurality of discrete first records are recorded as a plurality of microfilm frames on a plurality of microfilm strips;

said first record selection means comprises means for selecting a strip of microfilm, means for selecting a frame of the microfilm strip for display as the frames are moved in sequence past the selecting means, and means for individually selecting a discrete record on a displayed frame; and said coding means comprises a plurality of switches operable in predetermined combinations in response to the selection of a particular strip, means for counting the microfilm frames sequentially passing said frame selection means to enumerate the frame selected by said frame selecting means, and means for indicating the position of said individual record selecting means relative to the displayed frame, whereby these three sources of information identify the selected individual record and provide said unique code for selecting the associated second record.

3. Information storage and retrieval equipment according to claim 2 wherein said second information store comprises magnetic data storage means adapted to cooperate with electronic data processing and retrieval means responsive to said code signal to retrieve and display the second record corresponding to the selected first record.

4. Information storage and retrieval equipment according to claim 1 further including manual data entry means for altering selected records among said readily alterable second records.

5. Information storage and retrieval equipment according to claim 1 wherein said viewing surface is the screen of said cathode-ray tube which has a transparent window therein, and said optical projection means is positioned to project a representation of said first record onto the tube screen.